(12) United States Patent
Yu et al.

(10) Patent No.: US 10,080,266 B2
(45) Date of Patent: Sep. 18, 2018

(54) PLUG-IN MULTIFUNCTIONAL LED POWER SYSTEM

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Jianfeng Yu, Zhejiang (CN); Qiming Wang, Zhejiang (CN); Guanghua Wu, Zhejiang (CN); Jianguo Dong, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/819,971

(22) Filed: Nov. 21, 2017

(65) Prior Publication Data
US 2018/0146525 A1 May 24, 2018

(30) Foreign Application Priority Data

Nov. 22, 2016 (CN) .......................... 2016 1 1040575

(51) Int. Cl.
*H05B 33/08* (2006.01)
*H05B 37/02* (2006.01)

(52) U.S. Cl.
CPC ..... *H05B 33/0842* (2013.01); *H05B 33/0818* (2013.01); *H05B 33/0824* (2013.01); *H05B 37/02* (2013.01)

(58) Field of Classification Search
CPC .................................................. H05B 33/0842
See application file for complete search history.

(56) References Cited

U.S. PATENT DOCUMENTS

| | | | | |
|---|---|---|---|---|
| 2006/0170287 A1* | 8/2006 | Ito | ........................ | B60Q 11/005 307/10.1 |
| 2008/0042628 A1* | 2/2008 | Wang | ...................... | H02M 1/08 323/271 |
| 2011/0285685 A1* | 11/2011 | Naito | ................. | H05B 33/0818 345/211 |
| 2013/0155561 A1* | 6/2013 | Lai | ......................... | H02H 3/202 361/91.5 |
| 2015/0271882 A1* | 9/2015 | Melanson | .......... | H05B 33/0815 315/186 |

(Continued)

*Primary Examiner* — Jue Zhang
*Assistant Examiner* — Trinh Q Dang
(74) *Attorney, Agent, or Firm* — Wang Law Firm, Inc.

(57) ABSTRACT

A plug-in multifunctional LED power system includes a power supply module, at least one output terminal, a switch module, a trigger conversion module, a compatible circuit module, and a replaceable control chip module. The trigger conversion module includes a first, second and third resistors connected in series from a high level output terminal to a ground. The switch module includes an N-type MOS transistor. The compatible circuit module is used for controlling on-off of the switching module by different control chip modules. The control chip module processes the input signal of the signal access unit and outputs a control signal for controlling the on/off of the switching unit so as to control the operating state of a LED lamp. The plug-in multi-functional LED power supply system can solve the increase of the production costs and the inconvenience for user installation caused by more existing power supply types and different models.

10 Claims, 2 Drawing Sheets

(56) References Cited

U.S. PATENT DOCUMENTS

| | | | | |
|---|---|---|---|---|
| 2015/0340954 A1* | 11/2015 | Hu | ..................... | H05B 33/0815 363/21.16 |
| 2018/0039296 A1* | 2/2018 | Deguchi | ................. | G05F 1/575 |

* cited by examiner

PLUG-IN MULTIFUNCTIONAL LED POWER SYSTEM

RELATED APPLICATION

This application claims priority to Chinese Patent Application No. CN 201611040575.1, filed on Nov. 22, 2016.

BACKGROUND

1. Technical Field

The present invention relates to a power supply apparatus for an illumination device, with particular emphasis on a plug-in multifunctional LED power system.

2. Description of the Related Art

In ordinary daily life, all kinds of lighting apparatus can be seen everywhere, such as fluorescent lamps, street lamps, table lamps, artistic lamps and so on. In the above-described lighting apparatus, the tungsten bulb is traditionally used as a light-emitting light source. In recent years, due to the ever-changing technology, light-emitting diode (LED) has been used as a light source. Moreover, in addition to lighting apparatus, for the general traffic signs, billboards, headlights etc., light-emitting diode (LED) has also been used as a light source. The light-emitting diode (LED) as a light source has the advantages of energy-saving and greater brightness. Therefore, it has been gradually common.

With the improvement of people's living standards, people also have a variety of requirements of the effect of lighting. For example, some people wants to use wireless control type, and others use mobile phones or other smart devices with Bluetooth to control, and others automatically control according to the environment, and also others don't need to control. These control styles makes the power supply for the LED lights not the same. The power supply has different types and different models, which not only leads to increase the production costs, but also is inconvenient for installation and is not conducive to the promotion.

BRIEF DESCRIPTION OF THE DRAWINGS

The drawings described herein are intended to promote a further understanding of the present invention, as follows.

DETAILED DESCRIPTION OF THE INVENTION

The present application is illustrated by way of the following detailed description based on of the accompanying drawings. It should be noted that illustration to the embodiment in this application is not intended to limit the invention.

Figure 1:
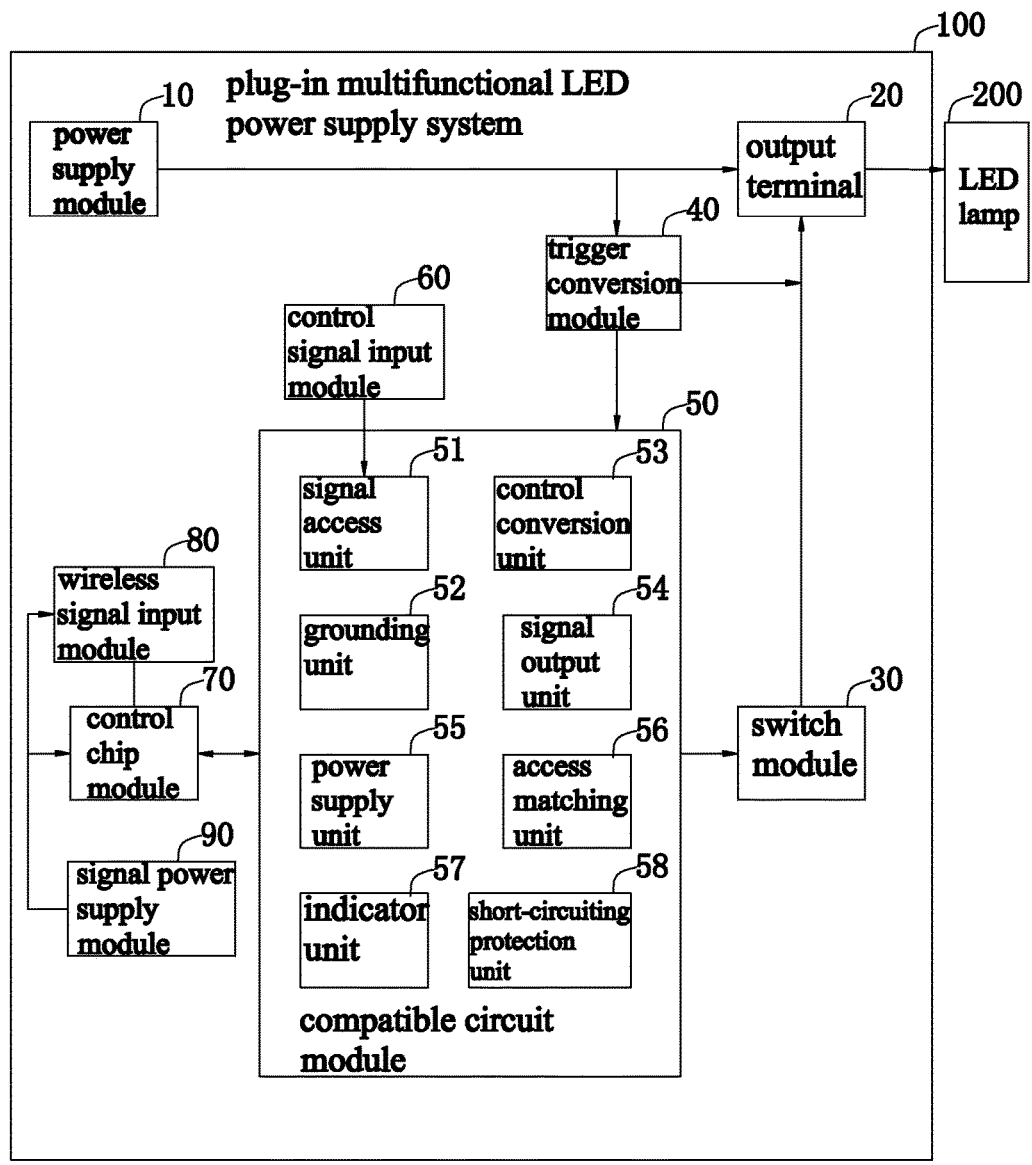
FIG. 1 is a block diagram of a plug-in multifunctional LED power supply system provided by the present invention.
Figure 2:
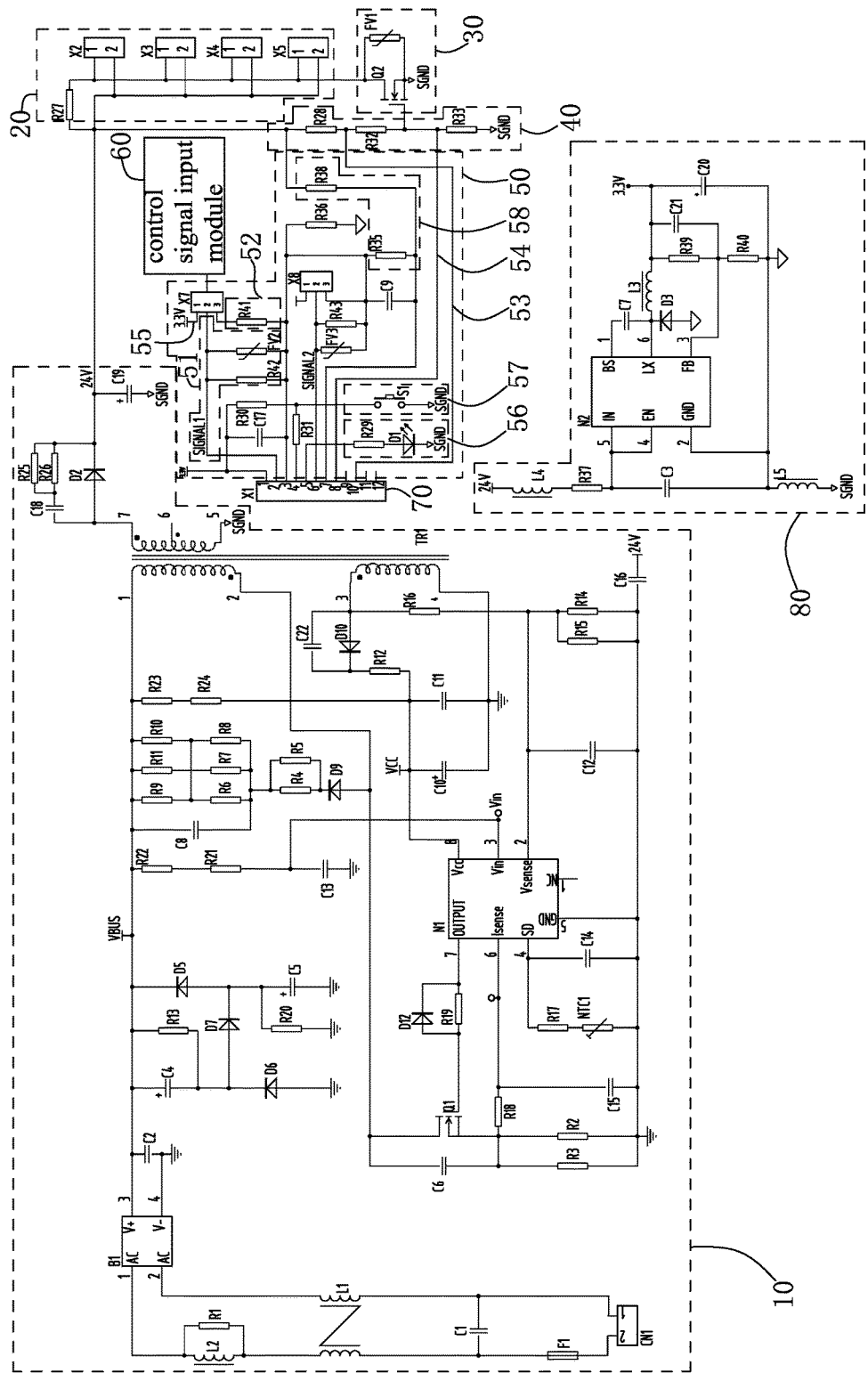
FIG. 2 is a circuit diagram of the plug-in multifunctional LED power supply system of FIG. 1.

Please referring to FIG. 1 and FIG. 2, a plug-in multifunctional LED power supply system provided by the present invention is shown. The plug-in multifunctional LED power supply system 100 is used to supply power for an LED lamp 200 and to control the operating state of the LED lamp 200. It is well known to those skilled in the art that the operating state of the LED lamp 200 may be brightness or switch control, or may be temperature, color control, or the like. The plug-in multifunctional LED power supply system 100 includes a power supply module 10 providing a regulated constant voltage for the LED lamp 200, at least one output terminal 20 electrically connected to a high level output of the power supply module 10, a switch module 30 connected between the output terminal 20 and ground, a trigger conversion module 40 connected between the high level output of the power supply module 10 and a ground, a compatible circuit module 50 electrically connected to the trigger conversion module 40, at least a control signal input module 60 electrically connected to the compatible circuit module 50, a plug-in replaceable control chip module 70 electrically connected to the compatible circuit module 50. It is contemplated that the plug-in multifunctional LED power supply system 100 may also comprise other functional modules, such as manual switch modules, which are well known in the art and will not be described in detail herein.

The power supply module 10 is directly electrically connected to the mains, and output a stable voltage adapted to amplitude conversion under the effect of the functional unit such as a filter circuit and a power factor correction. Under action of the effect of a coil unit, a RCD absorption unit, and a feedback unit, a stable voltage amplitude will be converted into stable alternating current with minimum noise. A voltage value is rated voltage for the LED lamp, such as 24V or 12V etc., and finally the alternating current will be converted into a regulated constant voltage by a rectifier circuit. As shown in FIG. 2, it shows all the functional units including in the entire power supply module 10, as well as various electronic components. But they are common parts for supplying power to the LED lamp 200, that is, each of the LED lamp power supplies includes the power supply module 10 composed of the above-described functional units. Therefore, these functional units are not described here in detail.

The output terminal 20, also known as a splitter, is configured to electrically connected directly to the LED lamp 200 to provide power therefor. The output terminal 20 is provided so that the plug-in multi-function LED power supply system 100 can electrically connect with a plurality of LED lamps 200. In the present embodiment, four output terminals 20 are shown. The four output terminals 20 are arranged in parallel, and it is conceivable that the number may be set according to actual requirements.

The switch module 30 is configured to control the on/off of the output terminal 20 and further turn on or turn off the LED lamp 200 on the output terminal 20. In order to realize the control of the operating state of the LED lamp 200, such as brightness, color temperature, color, etc., the switch module 30 is not a normal switch but may control the operating state of the LED lamp 200 according to a control signal such as PWM signal which automatically turns on and turns off a switch at high speed. The operating state can be ratio of the time of turning on and turning off the LED lamp 200 so as to adjust the brightness of the LED lamp 200. Of course, the frequency of the switch is high, it is difficult to detect for naked eye. The switch module 30 comprises an N-type MOS transistor Q2 and a varistor FV1. Before explaining the circuit connection relationship of the switch module 30, at first it is necessary to explain the circuit connection relationship of the trigger conversion module 40.

The trigger conversion module 40 is configured to control the on/off of the switch module 30 in accordance that whether the plug-in multifunctional LED power supply system 100 is inserted or electrically connected to the control chip module 70. When the plug-in multifunctional LED power supply system 100 is not inserted into the control chip module 70, the switch module 30 should be in an open mode. And the operate state of the LED lamp 200 connected to the output terminal 20 cannot be adjusted. That is to say, the LED lamp 200 is in bright state. When the control chip module 70 is inserted or electrically connected to the plug-in multifunctional LED power supply system 100, the switch module 30 should be controlled by an output signal of the control chip module 70. Thus, the operating mode of the switch module 30 is performed by the trigger conversion module 40. The trigger conversion module 40 includes a first, second and third resistors R28, R32, and R33 connected in series from a high level output terminal to the ground. The operating mode of the switch module 30 can be controlled by designing different circuit connections. The specific circuit connection will be described in detail below.

A source of the N-type MOS transistor of the switch module 30 is grounded and a drain is electrically connected to the output terminal 20, and a grid electrode is electrically connected between the second resistor R32 and the third resistor R33 of the trigger conversion module 40. When the control chip module 70 is not electrically connected to the plug-in multifunctional LED power supply system 100, one end of the trigger conversion module 40 is at a high level and the voltage between the second resistor R32 and the third resistor R33 is also high, the N-type MOS transistor is conducted and in open state. The two ends of the varistor FV1 are electrically connected between the source and the drain of the N-type MOS transistor. When the noise such as static power enters the power supply system 100 through the input terminal 20, the varistor FV1 will shield.

The compatible circuit module 50 is configured to control the on/off of the switch module 30 when different control chip modules 70 are inserted or electrically connected to the plug-in multifunctional LED power supply system 100. Due to the itself characteristics and structure of the control chip module 70, an input and output signals are both digital signal circuits and the switch module 30 is an analog signal circuit and while the control chip module 70 also needs to receive wireless or wired control signal from users. Therefore, the compatible circuit module 50 is required to perform the co-operation between the above-described various functional modules. The compatible circuit module 50 includes a signal access unit 51, a grounding unit 52, a control conversion unit 53, a signal output unit 54, a power supply unit 55, an access matching unit 56, an indicator unit 57, and a short-circuit protection unit 58. The above functional units of the compatible circuit module 50 are independent of each other and are configured to electrically connect to the control chip module 70, the control signal input module 60, the switch module 30, and the like under different functions. The signal access unit 51 is electrically connected between the control signal input module 60 and the control chip module 70 to input a control signal to the control chip module 70, i.e., the control signal input module 60 inputs a control signal to the control chip module 70 through the signal access unit 51. The signal access unit 51 also includes a varistor FV2 and a stable resistor R42. The action of the varistor FV2 is that the varistor FV2 will shield when noise such as static electricity enters the compatible circuit module 50 through the signal access unit 51. The grounding unit 52 electrically connects the control signal input module 60 and the control chip module 70 to the ground so as to form a circuit loop for the control signal input module 60 and the control chip module 70 can operate normally. One end of the control conversion unit 53 is electrically connected between the first resistor R28 and the second resistor R32 of the trigger conversion module 40 and the other is electrically connected to the control chip module 70. The control chip module 70 outputs a short-circuit signal through the control conversion unit 53, and the connecting end of the first resistor R28 and the second resistor R32 is directly grounded so that the grid electrode of the N-type MOS transistor is at a low level so as to turn off it. It is possible to know that the plug-in multifunctional LED power supply system 100 is inserted or electrically connected to the control chip module 70, the LED lamp 200 will work under the control chip module 70. The signal output unit 54 is electrically connected between the control chip module 70 and the switch module 30 to control the on/off of the switch module 30. That is to say, the signal output unit 54 is used to control the on/off of the N-type MOS transistor so as to further control the operate state of the LED lamp 200. Specifically, the signal output unit 54 is electrically connected to the grid electrode of the N-type MOS transistor. The power supply unit 55 electrically connects the control signal input module 60 and the control chip module 70 to provide a regulated power supply, i.e., a regulated rated voltage. The access matching unit 56 is configured to trigger the start of a matching control program to match the functional modules which need to match so that signal transmission can be performed. The indicator unit 57 is electrically connected to the control chip module 70 and is controlled by the control chip module 70 to display an operating state of the control chip module 70. The short-circuit protection unit 58 includes two voltage dividing resistors R38 and R35 connected in series. One end of the short-circuiting protection unit 58 is electrically connected to the high-level input of the power supply module 10 and the other is electrically connected to the ground. And the protected functional module, i.e., the terminal of the control chip module 70, is electrically connected between the two voltage dividing resistors R38 and R35. The short-circuit signal is input to the control chip module 70 by the variation of the divided voltage of the two voltage dividing resistors R38 and R35, and then the control chip module 70 output the turn-off signal to determine the switching module 30, and then turn off the entire circuit to achieve the purpose of protection.

The control signal input module 60 is configured to output a control signal, and is connected to an input of the signal access unit 51. The control signal input module 60 may be an optical probe or an infrared probe. The optical probe can detect the illuminance of the current environment and output the control signal to the control chip module 70 according to the illumination of the current environment and control the switch module 30 to turn on or turn off the LED lamp 200. While the infrared probe is used to detect whether infrared rays are generated by the current environment, such as whether someone is in the current environment. The control signal input module 60 outputs the control signal to control the switch module 30 so as to turn on the LED lamp 200. The control signal input module 60 may be provided with a plurality of the plurality of probes. As shown in FIG. 2, in the present embodiment, the compatible circuit module 50 is connected to the two control circuit input modules 60, each of the control signal input modules 60 is connected to the power supply unit 55, the signal access unit 51 and the grounding unit 52 of the compatible circuit module 50 to complete the output of the signal and to operate normally.

The control chip module 70 may be an integrated chip, such as a microcontroller, a PLC, an integrated circuit with a central processing unit which can process data. It is well known to those skilled in the art that the microcontroller, the PLC, and the central processing unit are the prior arts. However, the operating mode or operating instructions need to be input by the user according to their own requirements to achieve the user's own control purposes. In the present embodiment, the control chip module 70 is a microcontroller, and the user inputs program instructions for controlling the operating state of the LED lamp 200 according to their own requirements. Meanwhile, it is well known to those skilled in the art that each of the microcontrollers has a plurality of pins respectively for performing different functions to input or output a control signal. In the present embodiment, a plurality of different functional pins of the control chip module 70 are respectively connected to a signal access unit 51, a grounding unit 52, a control conversion unit 53, a signal output unit 54, a power supply unit 55, the access matching unit 56, the indicator unit 57, and the short-circuit protection unit 58 to complete the input and output of the control signal. Specifically, the control chip module 70 inputs the signal of the signal access unit 51, and the input signal is compared and calculated through program instruction and the signal output unit 54 outputs the processed control signal to the switch module 30, that is, the N-type MOS transistor. The output signal of the signal output unit 54 may be a PWM signal which has a square wave and a certain duty ratio, and the output signal controls the switch of the N-type MOS transistor and further controls the operating state of the LED lamp 200. The control chip module 70 can receive the control signal not only from the signal access unit 51 but also from other signal sources. When the signal access unit 51 has no access to the control signal input module 60, the control chip module 70 may also receive signals from a wireless signal input module.

Thus, the plug-in multifunctional LED power supply system 100 may also include a wireless signal input module 80. The wireless signal input module 80 can be matched with the control chip module 70 to output different control signals according to the user's request. Depending on the type of the control chip module 70, the wireless signal input module 80 may have different signal transmission modes. The wireless signal input module 80 may include a wireless signal transmitting unit meanwhile the control chip module 70 may comprise a wireless signal receiving unit, signal frequency of the wireless signal transmitting and receiving units is 2.4 g Hz, 133 MHz, 433 MHz, and so on. The wireless signal input module 80 may also be a Bluetooth module, and the control chip module 70 also includes a Bluetooth module to be matched with it. The matching action is performed by the access paired unit 56. When the user triggers the access matching unit 56, the matching control program of the wireless signal input module 80 is started and the matching control program of the control chip module is matched, after matching is successful, signal can be transmitted.

In addition, it is contemplated that the plug-in multifunctional LED power supply system 100 may also include a signal power supply module 90 in order to provide a regulated power supply to the control chip module 70 and the control signal input module 60. The signal power supply module 90 is electrically connected to a high level output terminal of the power supply module 10 and is adapted to convert a high level output from the power supply module 10 into a regulated constant voltage suitable for the control signal input module 60 and the control chip module 70. As shown in FIG. 2, the output voltage of the signal power supply module 90 is 3V, and its step-down voltage circuit should be well known to those skilled in the art and will not be described in detail here.

The power supply module 10 is directly electrically connected to the mains and functions as a functional unit such as a filter circuit and a power factor correction so as to be a stable voltage adapted to amplitude conversion. After the coil unit, the RCD absorption unit, and the feedback Unit of the role of the stability of the voltage amplitude into the minimum noise, stable AC, the voltage value for the LED lamp rated voltage, such as 24V or 12V, etc., and finally through the rectifier circuit, the AC conversion to compliance Constant voltage. As shown in FIG. 2, it shows all the functional units included in the entire power supply module 10, as well as various electronic components. But it is a common part for supplying power to the LED lamp 200, that is, each of the LED lamp power supplies includes the power supply module 10 composed of the above-described functional units. Therefore, these functional units are not described here in detail.

Since the plug-in multifunctional LED power supply system 100 includes the trigger conversion module 40 and the compatible circuit module 50, and the compatible circuit module 50 includes the signal access unit 51, the grounding unit 52, the control conversion unit 53, and the signal output unit 54, such that plug-in multifunctional LED power supply system 100 can operate without the insertion or electrical access to the control chip module 70 and can be switched to the control chip module 70 immediately when the control chip module 70 is electrically connected, and because of the existence of the compatible circuit module 50, different types of control chip module 70 can be electrically connected so as to achieve the aim that a power supply has a variety of functions, and thus to solve the increase of the production costs and the inconvenience for user installation caused by more existing power supply types and different models.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:
1. A plug-in multifunctional LED power supply system for supplying power to LED lamp and controlling the operating state of the LED lamps, comprising:
    a power supply module providing a regulated constant voltage for the LED lamp,
    at least one output terminal electrically connected to the high level output terminal of the power supply module,
    a switch module being connected between the output terminal and a ground,
    a trigger conversion module being connected between the high level output of the power supply module and the ground,
    a compatible circuit module being electrically connected to the trigger conversion module,
    a replaceable plug-in control chip module being electrically connected to the compatible circuit module, the output terminal used for electrically connecting LED lamps, the trigger conversion module comprising a first, second and third resistors connected in series from a high level output terminal to the ground, the switch module comprising an N-type MOS transistor, a source of the N-type MOS transistor being grounded, a drain being electrically connected with the output terminal, and a grid electrode being electrically connected between the second and the third resistors of the trigger conversion module, and the compatible circuit module being configured to control on/off of the switching module by different control chip modules and comprising a signal access unit, a grounding unit, a control conversion unit, and a signal output unit, the signal access unit being electrically connected to the control chip module to input a control signal to the control chip module, the grounding unit being electrically connected to a control signal input module and the control chip module to form a loop circuit, one end of the control conversion unit being electrically connected between the first resistor and the second resistors, the signal output unit being electrically connected between the control chip module and the switch module to control the on-off of the switch module, the control chip module processing the input signal of the signal access unit and outputting a control signal for controlling the on-off of the switching unit so as to control the operating state of the LED lamps.

2. The plug-in multifunctional LED power supply system as claimed in claim 1, wherein the plug-in multifunctional LED power supply system further comprises at least one control signal input module electrically connected to the compatible circuit module, and the control signal input module is used to output the control signal.

3. The plug-in multifunctional LED power supply system as claimed in claim 1, wherein the compatible circuit module further comprises a power supply unit providing a regulated constant voltage for the control signal input module and the control chip module, and an instruction unit controlled by the control chip module and displaying the operating state of the control chip module.

4. The plug-in multifunctional LED power supply system as claimed in claim 1, wherein the compatible circuit module further comprises a wireless signal input module which is matched with the control chip module and inputs a control signal for the control chip module, the compatible circuit module further comprises an access matching control unit for triggering a matching control program of the wireless signal input module and the control chip module.

5. The plug-in multifunctional LED power supply system as claimed in claim 1, wherein the compatible capacitive module further comprises a short circuit protection unit electrically connected between the power supply module and the ground comprises two resistors R38, R35 connected in series, wiring terminals of the control chip module are electrically connected between the two resistors R38, R35.

6. The plug-in multi-function LED power supply system according to claim 1, wherein a varistor is connected in series between the signal access unit and the ground unit.

7. The plug-in multi-function LED power supply system according to claim 1, wherein a filter resistor is connected in series between the signal access unit and the ground unit.

8. The plug-in multi-function LED power supply system according to claim 1, wherein the plug-in multifunctional LED power supply system further comprises a signal power supply module electrically connected to the high level output of the power supply module for converting the high level output of the power supply module into a regulated constant voltage suitable for the control signal input module and the control chip module.

9. The plug-in multifunctional LED power supply system as claimed in claim 4, wherein the wireless signal input module comprises a wireless signal transmitting unit and the control chip module comprises a wireless signal receiving unit, the signal frequency of the wireless signal transmitting unit and receiving units is 2.4 G Hz.

10. The plug-in multifunctional LED power supply system as claimed in claim 4, wherein the wireless signal input module comprises a Bluetooth module.

* * * * *